United States Patent Office 3,304,043
Patented Feb. 14, 1967

3,304,043
RESILIENT MOUNTING
Merrill G. Beck, Erie, Pa., assignor to Lord Corporation,
a corporation of Pennsylvania
Filed Mar. 2, 1965, Ser. No. 436,590
1 Claim. (Cl. 248—358)

This invention is intended to simplify the installation and increase the load carrying ability of resilient mountings. In a preferred form, the mounting has a bushing of elastomer which is dropped into a socket in the supporting member and is fastened in place by a bolt extending through a center tube. At the lower end of the bushing is bonded a metal ring which seats on the bottom of the socket and prevents extrusion of the elastomer through the bottom of the socket.

Figure 1:
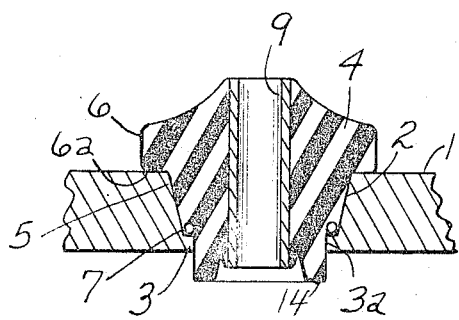
Figure 2:
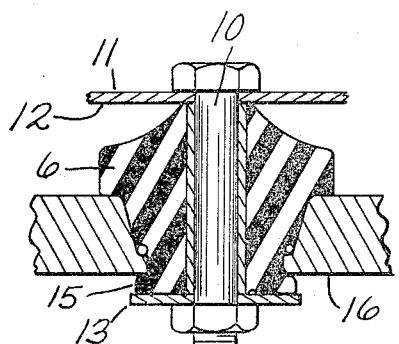
Figure 3:
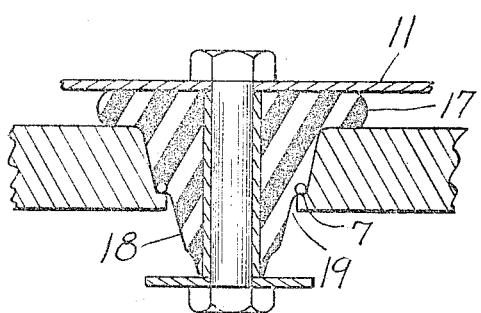
Figure 4:
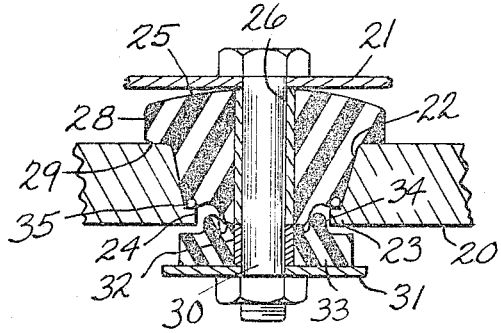
Figure 5:
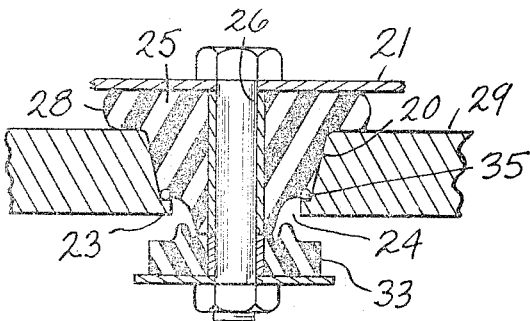

In the drawing, FIG. 1 is a sectional elevation through a resilient mounting showing the first step in assembly, FIG. 2 is a sectional elevation of the assembled mounting, FIG. 3 is a sectional elevation of the mounting under heavy load, FIG. 4 is a sectional elevation through a modification shown under light load, and FIG. 5 is a sectional elevation through the modification under under full load.

The supporting member 1 has an open ended socket with side walls 2 and an inwardly extending bottom wall 3 providing a seat around opening 3a. The socket need not be made to accurate dimensions. It may be cast into the supporting member 1. Preferably, the side walls taper or converge toward the bottom wall 3. The taper facilitates casting and also facilitates assembly of the mounting which has a body 4 of elastomer having an external surface 5 mating with and unbonded to the side and bottom walls 2 and 3 of the socket. At the upper end, the body of elastomer has a head 6 overlapping the upper surface 6a of the supporting member 1 around the socket. At the outer part of the lower end of the elastomer, there is bonded into the elastomer a metal ring 7. The ring 7 seats on the upper surface of the seat 3 adjacent the outer part of the seat and anchors the lower end elastomer to the seat. The diameter of the ring 7 is greater than the center opening 3a. At the center of the elastomer is bonded or otherwise fixed a rigid tube 9 suitably fastened, for example by through bolt 10, to a bracket 11 on the supported member (not shown). The bracket 11 has an under surface 12 overlapping the head 6 of the elastomer. The upper surface of the head 6 flares away from the adjacent surface 12 radially outward from the center of the head so that light loads are applied primarily to the tube 9 and it is not until heavy loads are applied that the head 6 of the elastomer is subjected to direct compression between the surface 12 of the bracket and the surface 6a on the supporting member 1. At the lower end of the bolt 10 is a washer 13 which overlaps a tubular skirt 14 on the elastomer projecting through the opening 3a. As the bolt is tightened, the skirt 14 is compressed axially and expanded radially providing a section 15 of elastomer between the washer 13 and the adjacent surface 16 of the supporting member which cushions upward or rebound forces exerted by the bracket 11. In the assembled position shown in FIG. 2, the bracket 11 is tight against the upper end of the tube 9 and the washer 13 is tight against the lower end of the tube 9. This suggests that the tube 9 need not be made in a single piece as shown since several pieces in end to end relation would serve the same purpose. The section 9 could also be integral with the bolt 10.

The mounting is particularly advantageous in load carrying vehicles where there is a substantial variation in load from no load to full load and where heavy shock loads are added to the normal load. Under light load conditions, the mounting has the position shown in FIG. 2 where vertical vibrations are accommodated primarily by shear of the elastomer 4 between the tube 9 and the adjacent walls 2 of the socket. Since rubber is relatively soft in shear, this provides a soft spring desirable for light loads. As the load increases, the tube 9 moves downward in the elastomer 4 and the under side 12 of the bracket 11 comes into progressively greater engagement with the upper surface of the head 6 of the elastomer, thereby carrying a greater proportion of the load on the surface 12 of the bracket with consequent greater resistance to movement. Under extreme loads, the mounting assumes the position in FIG. 3 where the head 6 of the elastomer is squeezed between the surface 12 of the bracket and the surrounding surface 6a of the supporting member, taking the load in compression and causing the bulges shown at 17. Under this condition, the load is primarily taken by the portion of the head between the surface 12 of the bracket and the opposed surface 6a of the supporting member and the mounting is accordingly quite stiff. This still provides adequate resilience because of the heavy loads involved. Heavy loads cause the lower end of the elastomer to assume the general shape illustrated in FIG. 3 where the central section 18 of the elastomer is pulled downward through the opening 3a in the socket, placing the elastomer under tension and causing it to pull away from the socket as indicated at 19. Under this condition, the ring 7 bonded into the elastomer remains seated on the flange 3 and holds the elastomer in engagement with the side wall 2 of the socket and prevents extrusion of the elastomer through the central opening 3a. This eliminates a cause of failure of the mountings.

In the mounting shown in FIGS. 1, 2 and 3, the rebound forces are taken by an integral skirt. In the mounting shown in FIGS. 4 and 5, a separate structure is provided for rebound.

In FIGS. 4 and 5, 20 indicates the supporting member and 21 indicates a bracket of the supported member (not shown) in load carrying relation to the supporting member. In the supporting member 20 is a socket 22 having at its lower end an inwardly extending flange 23 with a center opening 24. Seated in the socket is a body 25 of elastomer having fixed at its center a tube 26 of rigid material such as metal and having at its upper end an outwardly projecting head 28 which overlaps the upper surface 29 of the supporting member. The bracket 21 is fixed to the upper end of the tube 6 by a through bolt 30 having at its lower end a washer 31 engaging a tube 32 bonded at the center of a body 33 of elastomer. When the bolt is tightened, the tubes 26 and 32 are clamped solidly against each other in end to end relation and the body 25 of elastomer is firmly seated against the downwardly converging side walls of the socket 20. A bead 34 on the elastomer 33 enters the opening 24 in the flange 23 and provides a cushion for lateral forces.

Under light load conditions, the mounting assumes a position shown in FIG. 4 where vertical loads are taken primarily by shear between the tube 26 and the elastomer 25. As the load increases, the bracket 21 makes progressively greater contact with the upper end of the elastomer 25 around the tube 26 and finally under extreme load conditions assume the position shown in FIG. 5 where the head 28 of the elastomer is compressed directly between the bracket 21 and the surrounding surface 29 of the supporting structure. In this position, the tube 26 is moved downward, subjecting the elastomer 25 to tension, tending to pull it through the opening 24 in the flange 23 and also tending to pull the elastomer away from the side walls of the socket 20. As in the FIG. 1 to 3 construction, this action is prevented by the ring 35 bonded in the elastomer 25 and seated on the upper surface of the flange 23. Accordingly, under extreme over loads, contact is maintained between the socket 20 and flange 22 and the elastomer 25, preventing slippage which could cause chafing of the elastomer with resultant shorter life. Under the extreme conditions, the body 33 of elastomer which serves as the rebound cushion, moves away from the lower surface of the supporting structure as shown in FIG. 5.

What is claimed as new is:

In a resilient mounting, a supporting member having a socket with side walls converging toward a bottom wall at its lower end, said bottom wall having a central opening providing a seat around the opening, a body of elastomer in the socket mating with and unbonded to the side and bottom walls and having bonded in its lower end a rigid ring of larger inside diameter than said opening, said ring resting on the upper surface of said seat adjacent the outer part of said seat and holding the elastomer in engagement with the side walls, a supported member at the upper end of the socket, a connecting member fixed to the center of the elastomer and connected at its upper end to the supported member and having its lower end extending through said opening, a part fixed to said connecting member having a surface spaced below and underlying and in opposed relation to the supporting member, and a section of elastomer between said surface and the supporting member.

References Cited by the Examiner
UNITED STATES PATENTS

| | | | |
|---|---|---|---|
| 2,720,374 | 10/1955 | Hutton | 248—358 |
| 2,755,056 | 7/1956 | Hutton | 248—358 |
| 3,035,799 | 5/1962 | Peirce | 248—15 |
| 3,128,999 | 4/1964 | Schmitt | 248—358 X |

CLAUDE A. LE ROY, *Primary Examiner.*

JOHN PETO, *Assistant Examiner.*